US012621653B2

(12) United States Patent
Rojas

(10) Patent No.: US 12,621,653 B2
(45) Date of Patent: May 5, 2026

(54) INTERNET OF THINGS (IoT) DEVICE AND METHOD FOR MANAGING PROVISIONING OF ONE OR MORE UNIVERSAL INTEGRATED CIRCUIT CARDS (UICCs)

(71) Applicant: Easymetering LLC, Boca Raton, FL (US)

(72) Inventor: Byron Rojas, Guayaquil (EC)

(73) Assignee: Easymetering LLC

( * ) Notice: Subject to any disclaimer, the term of this patent is extended or adjusted under 35 U.S.C. 154(b) by 333 days.

(21) Appl. No.: 18/540,955

(22) Filed: Dec. 15, 2023

(65) Prior Publication Data

US 2024/0205665 A1     Jun. 20, 2024

Related U.S. Application Data

(60) Provisional application No. 63/387,508, filed on Dec. 15, 2022.

(51) Int. Cl.
| | |
|---|---|
| *H04W 12/30* | (2021.01) |
| *H04W 8/20* | (2009.01) |
| *H04W 8/24* | (2009.01) |

(52) U.S. Cl.
CPC ........... *H04W 8/205* (2013.01); *H04W 8/245* (2013.01); *H04W 12/35* (2021.01)

(58) Field of Classification Search
None
See application file for complete search history.

(56) References Cited

U.S. PATENT DOCUMENTS

| | | | |
|---|---|---|---|
| 2017/0289788 A1* | 10/2017 | Lalwaney | H04W 8/24 |
| 2020/0404501 A1* | 12/2020 | Kang | H04W 8/183 |

* cited by examiner

*Primary Examiner* — Steven Lim
(74) *Attorney, Agent, or Firm* — Jason C. Cameron

(57) ABSTRACT

A method for managing provisioning of universal integrated circuit cards (UICC) in internet of things (IoT) devices, is disclosed. The method comprises (a) initiating a mobile network connection with one or more IoT platforms; (b) receiving one or more instructions from the one or more IoT platforms; (c) downloading one or more subscription profiles associated with one or more second UICCs from the one or more IoT platforms upon receiving the one or more instructions; (d) configuring the one or more subscription profiles in the one or more second UICCs; and (e) rebooting the mobile network connection to connect the one or more second UICCs of the one or more internet of things (IoT) devices with the one or more second UICCs IoT platforms through a second cellular network based on the one or more second UICCs subscription profiles configured in the one or more second UICCs.

20 Claims, 8 Drawing Sheets

112

114

IoT Device
100

200

302

500

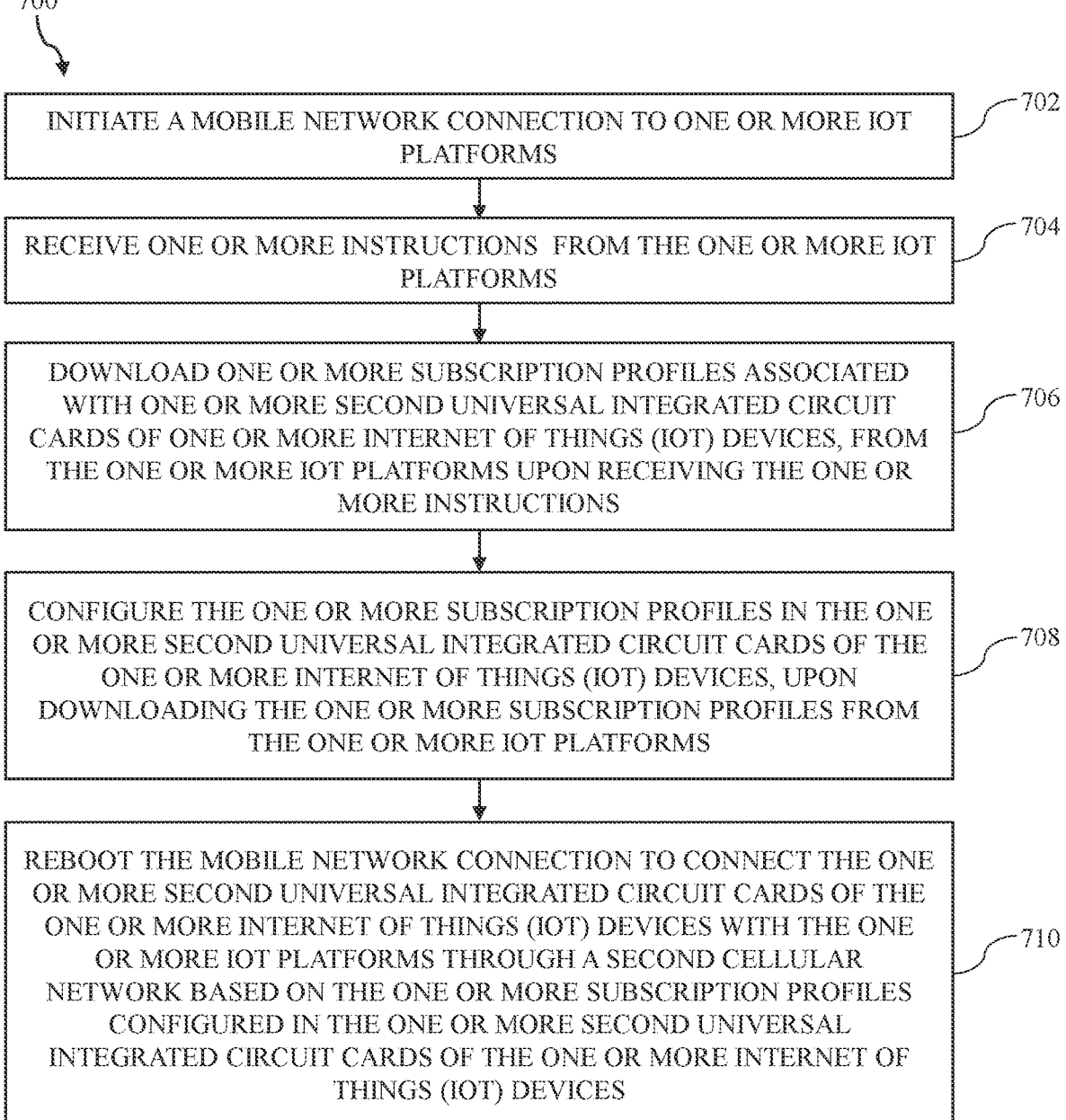

700

INITIATE A MOBILE NETWORK CONNECTION TO ONE OR MORE IOT PLATFORMS ⟋702

RECEIVE ONE OR MORE INSTRUCTIONS FROM THE ONE OR MORE IOT PLATFORMS ⟋704

DOWNLOAD ONE OR MORE SUBSCRIPTION PROFILES ASSOCIATED WITH ONE OR MORE SECOND UNIVERSAL INTEGRATED CIRCUIT CARDS OF ONE OR MORE INTERNET OF THINGS (IOT) DEVICES, FROM THE ONE OR MORE IOT PLATFORMS UPON RECEIVING THE ONE OR MORE INSTRUCTIONS ⟋706

CONFIGURE THE ONE OR MORE SUBSCRIPTION PROFILES IN THE ONE OR MORE SECOND UNIVERSAL INTEGRATED CIRCUIT CARDS OF THE ONE OR MORE INTERNET OF THINGS (IOT) DEVICES, UPON DOWNLOADING THE ONE OR MORE SUBSCRIPTION PROFILES FROM THE ONE OR MORE IOT PLATFORMS ⟋708

REBOOT THE MOBILE NETWORK CONNECTION TO CONNECT THE ONE OR MORE SECOND UNIVERSAL INTEGRATED CIRCUIT CARDS OF THE ONE OR MORE INTERNET OF THINGS (IOT) DEVICES WITH THE ONE OR MORE IOT PLATFORMS THROUGH A SECOND CELLULAR NETWORK BASED ON THE ONE OR MORE SUBSCRIPTION PROFILES CONFIGURED IN THE ONE OR MORE SECOND UNIVERSAL INTEGRATED CIRCUIT CARDS OF THE ONE OR MORE INTERNET OF THINGS (IOT) DEVICES ⟋710

FIG. 7

INTERNET OF THINGS (IoT) DEVICE AND METHOD FOR MANAGING PROVISIONING OF ONE OR MORE UNIVERSAL INTEGRATED CIRCUIT CARDS (UICCs)

FIELD OF INVENTION

Embodiments of a present disclosure relate to an Internet of Things (IoT) devices, and more particularly relate to an internet of things (IoT) device with a dual universal integrated circuit card (UICC) and a method for managing provisioning of one of the UICCs through a wireless communication system.

BACKGROUND

The Internet-of-Things (IoT) is an evolution of a Machine-to-Machine (M2M) technology. Although the M2M technology is a whole area of specialization that keeps progressing, an IoT technology brings more capabilities to a table. An IoT device, as well as an M2M device, relies upon communication protocols. The communication protocols enable the IoT device to connect and send information to an IoT platform. The IoT platform takes the information to analyze, command, and predict the behavior of complex processes in the IoT devices.

The IoT devices comprise microcontrollers optimized for specific tasks including at least one of: energy consumption monitoring and tracking, temperature monitoring, and the like. The IoT device may connect to an external no-smart device to add capabilities including remote reading and writing to the no-smart device and other purposes due to a wide range of networking applications. To establish a networking application, the most common way to do is setup a cellular interface in the IoT device because of its nature to provide ease of installation (i.e., just connect and work). The IoT devices are connected easily through a cellular network as the cellular networks are widely deployed and provide greater accessibility when compared to other networks. The cellular network or mobile network are terms with equivalent meaning that refer to an infrastructure that spans a wireless communication over a large area of land. Additionally, the IoT devices may have a wireless fidelity (Wi-Fi) interface, depending upon the feasibility and requirement for the operation of the IoT device.

Some energy meter manufacturers incorporate a bus interface inside energy meters to facilitate serial communication with other devices to add value to the energy meter as a product. The bus interface inside energy meters allows third companies specializing in telecommunications to develop electronic boards and software to achieve administration, inventory, monitoring of events, theft detections, network management, data collection, and the like, in the energy meters. As a result, the energy meters convert into the IoT devices adding revenue value.

In the IoT industry, there are several participants, including at least one of: IoT device manufacturers, IoT service providers, and Mobile Network Operators (MNO). Frequently, the IoT device manufacturers and IoT service providers combine to form what is referred to as an IoT solution provider. The IoT solution provider may offer the IoT devices with the capability to use different generations of Global System for Mobile communication (GSM) networks that comprise at least one of: second generation (2G), third generation (3G), fourth generation (4G), and fifth generation (5G or NR) technology. Additionally, the Mobile Network Operators (MNOs) are entities who provide the GSM networks via their cellular network. The Mobile Network Operators can offer data and voice services with different access policies to their services in their cellular network. For example, a voice service is billed based on time duration of a call, and a data service is billed based on a number of bytes transferred through their cellular network.

A subscriber identity module (SIM) is one of the crucial aspects for providing services through a cellular network. The SIM resides in a Universal Integrated Circuit Card (UICC). The UICC and the SIM card are terms with identical meanings from now on. The UICC lets an end user have portability of their service access to the cellular network offered by the MNO without being permanently attached to a device. Moreover, the UICC securely stores a subscription profile. The subscription profile comprises information related to the user, the MNO, the MNO services, and MNO keys to access the MNO services. Further, the MNO keys comprises passwords and authorization codes to access the MNO services. Further, the UICC comprises a small computer with an operating system. Random Access Memory (RAM), and one or more hardware processors.

The IoT device may work in remote or inaccessible locations where conditions can be extreme, for example, high temperatures. In an embodiment of the present disclosure, it is not ideal to use traditional UICCs because it may be problematic to insert or change the UICC in the IoT device. Therefore, the Global System for Mobile Communications Association (GSMA) developed the embedded UICC (eUICC) specifically for the IoT devices market. The embedded UICC (eUICC) comes in a chip format that can be soldered directly into a Printed Circuit Board (PCB). The eUICC can store or download various subscription profiles. The eUICC enable one subscription profile at a time.

There are two types of IoT device customers including at least one of: home customers and enterprise customers like power utilities. In the case of enterprise customers, the utilities may connect their IoT devices to their private mobile network to monitor energy consumption, report events, bill the energy consumption, and the like. However, the enterprise customers may not have the private mobile network infrastructure yet deployed. As a result, the enterprise customers cannot operate with the private cellular network as soon as possible, directly affecting the revenues. In this scenario, one possible solution could be to use UICCs from the MNO to connect their IoT devices quickly to the IoT platform. Once the private cellular network infrastructure is ready, the enterprise customer must go to each location and manually change the UICC to connect their IoT devices to their private mobile network. However, this solution is inappropriate because of logistics, economics, and time. Moreover, it demands the utility to have contracts with the MNOs and have some experience calculating the amount of a data plan required. Such technical details are not the business of the utilities.

It is essential to acknowledge that the UICC of the MNO has some constraints for the enterprise customers and does not provide control to manage the subscription profiles in their UICCs. Likewise, the UICCs in the IoT industry use data plans instead of short message services (SMS) because the information traffic redirects easier to the IoT platform and saves the budget. The problem is that remotely provisioning a subscriber profile to the UICC wouldn't happen because the GSMA standard heavily relies on SMS.

Hence, there is a need for an internet of things (IoT) device with a dual UICC and method for managing provisioning of one of the UICC through a wireless communication system, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a method for managing provisioning of one or more universal integrated circuit cards (UICC) in one or more internet of things (IoT) devices, is disclosed. The method comprises determining, by one or more switch interfaces of the one or more internet of things (IoT) devices, whether one or more first universal integrated circuit cards of one or more internet of things (IoT) devices is connected in a first cellular network through one or more first radio frequency (RF) transceiver antennas of the one or more internet of things (IoT) devices.

The method further comprises upon determining, switching, by the one or more switch interfaces of the one or more internet of things (IoT) devices, the one or more first universal integrated circuit cards of the one or more internet of things (IoT) devices connected in the first cellular network, to one or more second universal integrated circuit cards of the one or more internet of things (IoT) devices, by at least one of: one or more subscriber identity module (SIM) buses and one or more virtual buses.

The method further comprises initiating, by one or more cellular chipsets of the one or more internet of things (IoT) devices, a mobile network connection with one or more IoT platforms. The method further comprises receiving, by one or more secure microcontrollers of the one or more internet of things (IoT) devices, one or more instructions from the one or more IoT platforms.

The method further comprises downloading, by one or more firmware of the one or more internet of things (IoT) devices, one or more subscription profiles associated with the one or more second universal integrated circuit cards of the one or more internet of things (IoT) devices, from the one or more IoT platforms upon receiving the one or more instructions. The method further comprises configuring, by one or more application-based cellular modules of the one or more internet of things (IoT) devices, the one or more subscription profiles in the one or more second universal integrated circuit cards of the one or more internet of things (IoT) devices, upon downloading the one or more subscription profiles from the one or more IoT platforms. The method further comprises rebooting, by the one or more secure microcontrollers of the one or more internet of things (IoT) devices, the mobile network connection to connect the one or more second universal integrated circuit cards of the one or more internet of things (IoT) devices with the one or more IoT platforms through a second cellular network based on the one or more subscription profiles configured in the one or more second universal integrated circuit cards of the one or more internet of things (IoT) devices.

In an embodiment, the method further comprising (a) receiving, by the one or more subscriber identity module (SIM) buses, information associated with the switching of the one or more second universal integrated circuit cards from the one or more first universal integrated circuit cards; (b) transmitting, by the one or more subscriber identity module (SIM) buses, the information to the one or more cellular chipsets through at least one of: the one or more virtual buses and one or more cellular buses; (c) transmitting, by the one or more cellular chipsets, the information to the one or more IoT platforms; and (d) downloading, by the one or more firmware of the one or more internet of things (IoT) devices, the one or more subscription profiles associated with the one or more second universal integrated circuit cards of the one or more internet of things (IoT) devices, from the one or more IoT platforms, based on the information transmitted to the one or more IoT platforms.

In another embodiment, the method further comprising (a) receiving, by the one or more cellular chipsets, one or more attention (AT) instructions from the one or more secure microcontrollers through the one or more cellular buses; and (b) managing, by the one or more cellular chipsets, the mobile network connection to a radio access network, based on the one or more attention (AT) instructions received from the one or more secure microcontrollers.

In yet another embodiment, the method further comprising (a) generating, by one or more subscription managers-data preparation (SM-DP) of the one or more IoT platforms, the one or more subscription profiles for the one or more internet of things (IoT) devices, upon the mobile network connection is initiated between the one or more internet of things (IoT) devices and the one or more IoT platforms; (b) securely transmitting, by one or more subscription managers-secure routing (SM-SR) of the one or more IoT platforms, the one or more subscription profiles to the one or more internet of things (IoT) devices; (c) managing, by one or more IoT device register entities of the one or more IoT platforms, registration and activation of the one or more internet of things (IoT) devices, into the one or more IoT platforms; (d) managing, by one or more IoT device report entities of the one or more IoT platforms, one or more reports received from the one or more internet of things (IoT) devices; and (e) controlling, by one or more home subscription servers (HSS) of the one or more IoT platforms, a number of the one or more universal integrated circuit cards within a predetermined threshold value.

In yet another embodiment, the method further comprising connecting, by the one or more first radio frequency (RF) transceiver antennas, the one or more internet of things (IoT) devices with at least one of: one or more wireless fidelity (Wi-Fi) networks and one or more Bluetooth devices.

In yet another embodiment, the mobile network connection is initiated between the one or more internet of things (IoT) devices and the one or more IoT platforms through the one or more first radio frequency (RF) transceiver antennas, based on working conditions of one or more second radio frequency (RF) transceiver antennas.

In yet another embodiment, the provisioning of the one or more universal integrated circuit cards (UTCC) is performed when at least one of: the one or more first universal integrated circuit cards and the one or more second universal integrated circuit cards is in at least one of: an online state and an offline state.

In one aspect, an internet of things (IoT) device for managing provisioning of one or more universal integrated circuit cards (UICC), is disclosed. The internet of things (IoT) device comprises one or more switch interfaces connected to at least one of: one or more first universal integrated circuit cards (UICC) and one or more second universal integrated circuit cards. The one or more switch interfaces is configured to (a) determine whether the one or more first universal integrated circuit cards is connected in a first cellular network through one or more first radio frequency (RF) transceiver antennas of the one or more internet of things (IoT) devices and (b) upon determining, switch the one or more first universal integrated circuit cards connected in the first cellular network, to the one or more second universal integrated circuit cards, by at least one of: one or more subscriber identity module (SIM) buses and one or more virtual buses.

The internet of things (IoT) device further comprises one or more cellular chipsets configured to initiate a mobile network connection with one or more IoT platforms through one or more second radio frequency (RF) transceiver antennas. The internet of things (IoT) device further comprises one or more secure microcontrollers configured to receive one or more instructions from the one or more IoT platforms. The internet of things (IoT) device further comprises one or more firmware configured to download one or more subscription profiles associated with the one or more second universal integrated circuit cards, from the one or more IoT platforms upon receiving the one or more instructions.

The internet of things (IoT) device further comprises one or more application-based cellular modules configured to execute the one or more subscription profiles in the one or more second universal integrated circuit cards, upon downloading the one or more subscription profiles from the one or more IoT platforms. The internet of things (IoT) device further comprises the one or more secure microcontrollers is further configured to reboot the mobile network connection to connect the one or more second universal integrated circuit cards of the one or more internet of things (IoT) devices with the one or more IoT platforms through the second cellular network based on the one or more subscription profiles configured in the one or more second universal integrated circuit cards.

In an embodiment, the one or more subscriber identity module (SIM) buses is configured to: (a) receive information associated with the switching of the one or more second universal integrated circuit cards from the one or more first universal integrated circuit cards and (b) transmit the information to the one or more cellular chipsets through at least one of: the one or more virtual buses and one or more cellular buses. The one or more cellular chipsets is configured to transmit the information to the one or more IoT platforms. The one or more firmware is configured to download the one or more subscription profiles associated with the one or more second universal integrated circuit cards, from the one or more IoT platforms, based on the information transmitted to the one or more IoT platforms.

In another embodiment, the one or more cellular chipsets is configured to (a) receive one or more attention (AT) instructions from the one or more secure microcontrollers through the one or more cellular buses and (b) manage the mobile network connection to a radio access network, based on the one or more attention (AT) instructions received from the one or more secure microcontrollers.

In yet another embodiment, the one or more IoT platforms comprises at least one of: (a) one or more subscription managers-data preparation (SM-DP) configured to generate the one or more subscription profiles for the one or more internet of things (IoT) devices, upon the mobile network connection is initiated between the one or more internet of things (IoT) devices and the one or more IoT platforms, (b) one or more subscription managers-secure routing (SM-SR) configured to securely transmit the one or more subscription profiles to the one or more internet of things (IoT) devices, (c) one or more IoT device register entities configured to manage registration and activation of the one or more internet of things (IoT) devices, into the one or more IoT platforms, (d) one or more IoT device report entities configured to manage one or more reports received from the one or more internet of things (IoT) devices, and (e) one or more home subscription servers (HSS) configured to control a number of the one or more universal integrated circuit cards within a predetermined threshold value.

In yet another embodiment, the mobile network connection is initiated between the one or more internet of things (IoT) devices and the one or more IoT platforms through the one or more first radio frequency (RF) transceiver antennas, based on working conditions of the one or more second radio frequency (RF) transceiver antennas.

In yet another embodiment, the one or more first universal integrated circuit cards is surface-mounted to the one or more internet of things (IoT) devices.

In yet another embodiment, the one or more second universal integrated circuit cards is configured to be inserted within one or more surface-mounted slots in the one or more internet of things (IoT) devices.

In yet another embodiment, the one or more surface-mounted slots for the one or more second universal integrated circuit cards, is compatible with a fourth form factor (4FF) size of the one or more second universal integrated circuit cards.

In yet another embodiment, the one or more first radio frequency (RF) transceiver antennas is configured to connect with at least one of: one or more wireless fidelity (Wi-Fi) networks and one or more Bluetooth devices.

In yet another embodiment, the one or more secure microcontrollers comprises at least one of: one or more random access memories (RAM), one or more non-volatile memories, and one or more cryptographic accelerators.

In yet another embodiment, the provisioning of the one or more universal integrated circuit cards (UICC) is performed when at least one of: the one or more first universal integrated circuit cards (UICC) and the one or more second universal integrated circuit cards (UICC) is in at least one of: an online state and an offline state.

In another aspect of the present disclosure provides a non-transitory computer-readable storage medium having instructions stored therein. When executed by one or more hardware processors, cause the one or more hardware processors to initiate a mobile network connection with one or more IoT platforms.

The one or more hardware processors further receives one or more instructions from the one or more IoT platforms. The one or more hardware processors further downloads one or more subscription profiles associated with one or more second universal integrated circuit cards of the one or more internet of things (IoT) devices, from the one or more IoT platforms upon receiving the one or more instructions. The one or more hardware processors further configures the one or more subscription profiles in the one or more second universal integrated circuit cards of the one or more internet of things (IoT) devices, upon downloading the one or more subscription profiles from the one or more IoT platforms. The one or more hardware processors further reboots the mobile network connection to connect the one or more second universal integrated circuit cards of the one or more internet of things (IoT) devices with the one or more IoT platforms through a second cellular network based on the one or more subscription profiles configured in the one or more second universal integrated circuit cards of the one or more internet of things (IoT) devices.

In an embodiment, the one or more hardware processors further receives information associated with switching of the one or more second universal integrated circuit cards from one or more first universal integrated circuit cards. The one or more hardware processors further transmits the information to the one or more cellular chipsets through at least one of: the one or more virtual buses and one or more cellular buses. The one or more hardware processors further transmits the information to the one or more IoT platforms. The one or more hardware processors further downloads the one or more subscription profiles associated with the one or more second universal integrated circuit cards of the one or more internet of things (IoT) devices, from the one or more IoT platforms, based on the information transmitted to the one or more IoT platforms.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 7 is a flow diagram illustrating an exemplary method for managing provisioning of the one or more UICCs, in accordance with an embodiment of the present disclosure.

Figure 1A:
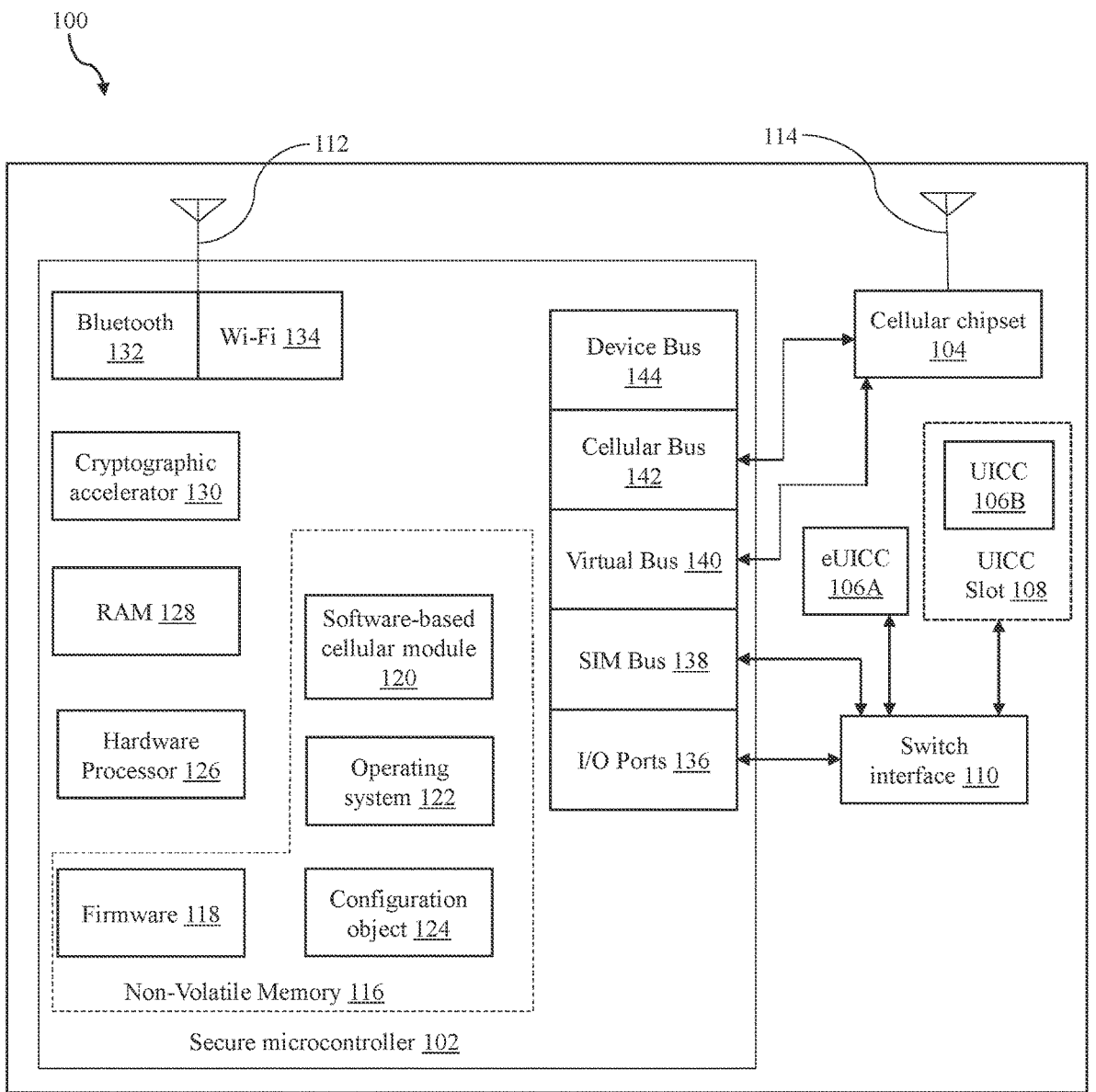
FIG. 1A is a block diagram illustrating an exemplary one or more Internet of Things (IoT) devices for managing provisioning of one or more universal integrated circuit cards (UICCs), in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises" a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

Referring now to the drawings, and more particularly to FIG. 1A through 7, where similar reference characters denote corresponding features consistently throughout the figures, there are shown preferred embodiments and these embodiments are described in the context of the following exemplary system and/or method.

FIG. 1A is a block diagram illustrating an exemplary one or more Internet of Things (IoT) devices 100 for managing provisioning of one or more universal integrated circuit cards (UICCs) 106 in accordance with an embodiment of the present disclosure.

According to FIG. 1A, the one or more IoT devices 100 comprises one or more secure microcontrollers 102, one or more cellular chipsets 104, one or more first Universal Integrated Circuit Cards (e.g., an embedded universal integrated circuit card (eUICC)) 106A, one or more surface-mounted slots 108 for one or more second universal integrated circuit cards (e.g., Universal Integrated Circuit Cards (eUICC)) 106B, one or more switch interfaces 110 being connected to the eUICC 106A and the UICC 106B, one or more first radio frequency (RF) transceiver antennas 112 for a first cellular network (e.g., a wireless local area network (WLAN), and one or more second radio frequency (RF) transceiver antennas 114 for the second cellular network (i.e., a mobile network 502). In an embodiment, the mobile network 502 may be at least one of: a public mobile network (i.e., the first cellular network) 602 and a private mobile network (i.e., the second cellular network) 604. In an embodiment, the one or more first radio frequency (RF)

transceiver antennas 112 is configured to connect with at least one of: one or more wireless fidelity (Wi-Fi) networks 134 and one or more Bluetooth devices 132.

The one or more secure microcontrollers 102 of the one or more IoT devices 100 further includes at least one of: one or more non-volatile memories 116, one or more hardware processors 126, one or more random access memories 128, and one or more cryptographic accelerators 130. The one or more secure microcontrollers 102 of the one or more IoT devices 100 further includes at least one of: one or more input output (V/O) ports 136, one or more subscriber identity module (SIM) buses 138, one or more virtual buses 140, one or more cellular buses 142, and one or more device buses 144.

The one or more non-volatile memories 116 includes at least one of: one or more firmware 118, one or more application-based cellular modules (i.e., one or more software-based cellular modules) 120, one or more operating systems 122, and one or more configuration objects 124. In an embodiment, The one or more configuration objects 124 is configured to hold the information necessary according to the customer's needs.

The one or more IoT devices 100 is connected to the second cellular network 604 using the one or more second radio frequency (RF) transceiver antennas 114 for the second cellular network. Further, the one or more IoT devices 100 is connected to the WLAN/WPAN network (i.e., the first cellular network 602) using the one or more first radio frequency (RF) transceiver antennas 112 for the WLAN/WPAN network 508. The predefined configuration for such connection is as specified by the one or more configuration objects 124.

In an embodiment, the one or more first universal integrated circuit cards 106A is surface-mounted to the one or more internet of things (IoT) devices 100. In an embodiment, the one or more second universal integrated circuit cards 106B is configured to be inserted within one or more surface-mounted slots 108 in the one or more internet of things (IoT) devices 100. In another embodiment, the one or more surface-mounted slots 108 for the one or more second universal integrated circuit cards 106B, is compatible with a fourth form factor (4FF) size of the one or more second universal integrated circuit cards 106B. In an embodiment of the present disclosure, the one or more secure microcontrollers 102 is connected to one or more switch interfaces 110 via the one or more input output (I/O) ports 136 for enabling at least one of: the eUICC 106A and the UICC 106B.

The one or more switch interfaces 110 is configured to determine whether the one or more first universal integrated circuit cards (eUICC) 106A of the one or more internet of things (IoT) devices 100 is connected in a first cellular network (e.g., the public mobile network 602) through the one or more first radio frequency (RF) transceiver antennas 112 of the one or more internet of things (IoT) devices 100. The one or more switch interfaces 110 is further configured to switch the one or more first universal integrated circuit cards 106A of the one or more internet of things (IoT) devices 100 connected in the first cellular network 602, to the one or more second universal integrated circuit cards 106B of the one or more internet of things (IoT) devices 100, by at least one of: the one or more subscriber identity module (SIM) buses 138 and one or more virtual buses 140.

The one or more subscriber identity module (SIM) buses 138 is connected to the one or more switch interfaces 110. The one or more subscriber identity module (SIM) buses 138 has bidirectional communication with one of either eUICC 106A or the UICC 106B, whichever is enabled by the one or more switch interfaces 110. The one or more subscriber identity module (SIM) buses 138 is configured to receive information associated with the switching of the one or more second universal integrated circuit cards 106B from the one or more first universal integrated circuit cards 106A. The one or more subscriber identity module (SIM) buses 138 is further configured to transmit the information to the one or more cellular chipsets 104 through at least one of: the one or more virtual buses 140 and the one or more cellular buses 142.

The one or more virtual buses (i.e., one or more virtual SIM buses) 140 is connected to the one or more cellular chipsets 104. Further, the one or more virtual buses 140 may replicate the bidirectional communication of the one or more subscriber identity module (SIM) buses 138 with one of either the eUICC 106A or the UICC 106B, whichever is enabled by the one or more switch interfaces 110. Further, the one or more virtual buses 140 may simulate the UICC 106B with all its features.

The one or more cellular chipsets 104 is configured to transmit the information to the one or more IoT platforms 302. The one or more cellular chipsets 104 is further configured to initiate/establish the mobile network connection with the one or more IoT platforms 302. In an embodiment, the mobile network connection is initiated/established between the one or more internet of things (IoT) devices 100 and the one or more IoT platforms 302 through the one or more first radio frequency (RF) transceiver antennas 112, based on working conditions (i.e., establishing of the mobile network connection is failed through the one or more second radio frequency (RF) transceiver antennas 114) of the one or more second radio frequency (RF) transceiver antennas 114. For initiating/establishing the mobile network connection, the one or more cellular chipsets 104 is configured to receive one or more attention (AT) instructions from the one or more secure microcontrollers 102 through the one or more cellular buses 142. The one or more cellular chipsets 104 is further configured to manage the mobile network connection to a radio access network (RAN), based on the one or more attention (AT) instructions (i.e., instruction commands) received from the one or more secure microcontrollers 102. In an embodiment, the one or more cellular buses 142 is connected to the one or more cellular chipsets 104 for sending the one or more attention (AT) instructions from the one or more secure microcontrollers 102 to the one or more cellular chipsets 104.

The one or more secure microcontrollers 102 of the one or more internet of things (IoT) devices 100 is configured to receive one or more instructions from the one or more IoT platforms 302. The one or more firmware 118 of the one or more internet of things (IoT) devices 100 is configured to download one or more subscription profiles associated with the one or more second universal integrated circuit cards 106B of the one or more internet of things (IoT) devices 100, from the one or more IoT platforms 302 upon receiving the one or more instructions.

The one or more application-based cellular modules (i.e., the software-based cellular modules) 120 of the one or more internet of things (IoT) devices 100 is configured to execute/configure the one or more subscription profiles as enabled one or more subscription profiles in the one or more second universal integrated circuit cards 106B of the one or more internet of things (IoT) devices 100, upon downloading the one or more subscription profiles from the one or more IoT platforms 302. The one or more secure microcontrollers 102 of the one or more internet of things (IoT) devices 100 is configured to reboot/restart the mobile network connection to connect the one or more second universal integrated circuit cards of the one or more internet of things (IoT) devices with the one or more IoT platforms 302 through the second cellular network 604 based on the one or more subscription profiles configured in the one or more second universal integrated circuit cards 106B of the one or more internet of things (IoT) devices 100. The one or more secure microcontrollers 102 of the one or more internet of things (IoT) devices 100 is further configured to restore the mobile network connection to connect to the one or more IoT platforms 302 if the enabled one or more subscription profiles in the one or more second universal integrated circuit cards 106B fails to enable the mobile network connection in the second cellular network 604.

Figure 1B:
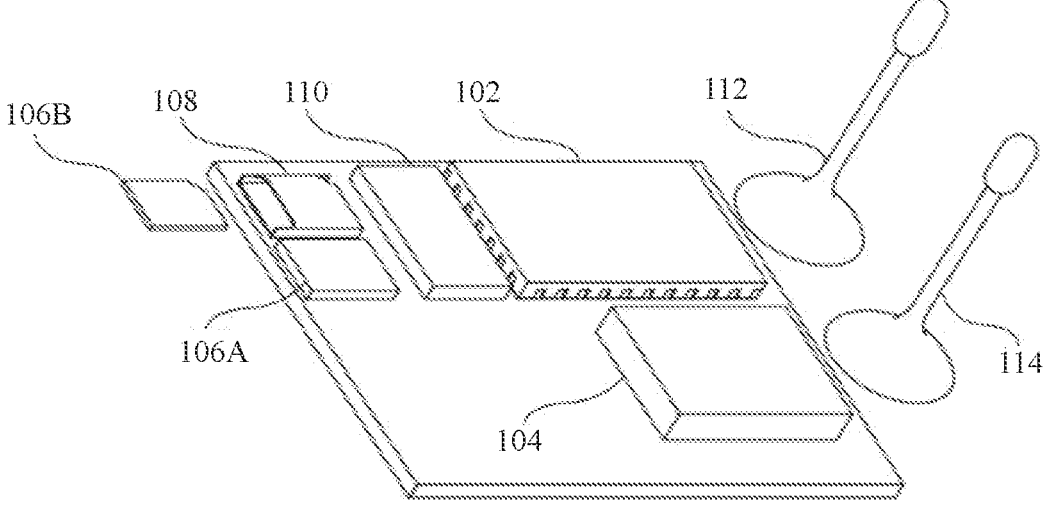
FIG. 1B is a schematic representation depicting the one or more IoT devices for managing provisioning of the one or more UICCs, in accordance with an embodiment of the present disclosure.

FIG. 1B is a schematic representation depicting the one or more IoT devices 100 for managing provisioning of the one or more UICCs 106, in accordance with an embodiment of the present disclosure. The one or more IoT devices 100, in FIG. 1B, includes the one or more secure microcontrollers 102, the one or more cellular chipsets 104, the one or more first universal integrated circuit cards (eUICC) 106A, the one or more second universal integrated circuit cards (UICC) 106B, the one or more surface-mounted slots 108, the one or more switch interfaces 110, the one or more first radio frequency (RF) transceiver antennas 112, and the one or more second radio frequency (RF) transceiver antennas 114. The functions/operations of the above said elements of the one or more IoT devices 100 have been explained in detail in above paragraphs.

Figure 2:
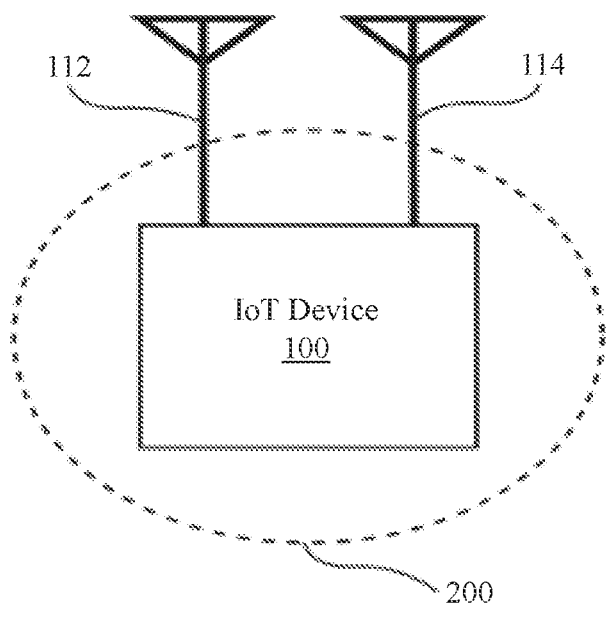
FIG. 2 is a schematic representation illustrating an exemplary connection between the one or more IoT devices and one or more host devices in accordance with an embodiment of the present disclosure.

FIG. 2 is a schematic representation illustrating an exemplary connection between the one or more IoT devices 100 and one or more host devices 200 in accordance with an embodiment of the present disclosure. According to FIG. 2, one usage of the one or more IoT devices 100 is to connect to the one or more host devices 200 via the one or more device buses 144. The one or more host devices 200 may include at least one of: an energy meter, a water meter, a gas meter, or any remote metering device in general. The one or more host devices 200 is connected to the one or more IoT platforms 302 using at least one of: the mobile cellular network 502 (i.e., the mobile network) or an internet 506 via the WLAN AP 508.

Figure 3:
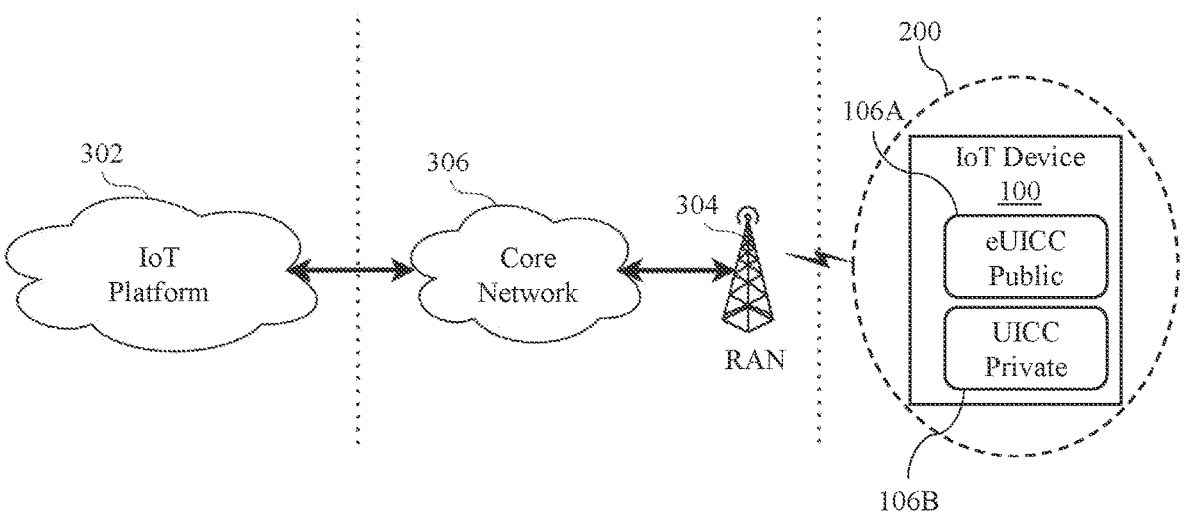
FIG. 3 is a schematic representation illustrating an exemplary connection between one or more IoT platforms and the one or more IoT devices, in accordance with an embodiment of the present disclosure.

FIG. 3 is a schematic representation illustrating an exemplary connection between the one or more IoT platforms 302 and the one or more IoT devices 100, in accordance with an embodiment of the present disclosure. According to FIG. 3, the one or more IoT devices 100 residing in the one or more host devices 200 is connected to a radio area network (RAN) 304 using either the eUICC 106A or the UICC 106B. Further, the RAN 304 is connected to a core network 306. Further, the core network 306 is connected to the one or more IoT platforms 302.

In an embodiment of the present disclosure, the one or more cellular chipsets 104 strictly requires a connection to the UICC 106B in order to manage the mobile network connection in the second cellular network 604. The terminals of one of the UICCs 106 pass by the one or more switch interfaces 110 and end up at the one or more subscriber identity module (SIM) buses 138. Further, the terminals virtualize and output through the one or more virtual buses 140 to finally arrive at the one or more cellular chipsets 104. The arrangement facilitates the management of the one or more IoT devices (i.e., a dual UICC system) 100, hence, the one or more virtual buses 140 and the one or more subscriber identity module (SIM) buses 138 are closely related. Even though the one or more cellular chipsets 104 handles the RF communication to the RAN 304 via the one or more second radio frequency (RF) transceiver antennas 114, the one or more cellular chipsets 104 still requires to receive the one or more instructions, such one or more instructions are AT commands coming from the one or more secure microcontrollers 102 via the one or more cellular buses 142.

In an embodiment of the present disclosure, the mobile network 502 may be a public mobile network 602 or a private mobile network 604. The public mobile network 602 or the private mobile network 604 strictly requires the one or more subscription profiles to provide the one or more IoT devices 100 a secure connection. The one or more subscription profiles is associated with the subscriber identity module (SIM) contained in any UICC type. The one or more IoT devices 100 is connected to the public mobile network 602 using the one or more subscription profiles from the eUICC 106A. Further, the one or more IoT devices 100 is connected to the private mobile network 604 using the one or more subscription profiles from the UICC 106B.

In an embodiment of the present disclosure, the SIM is a tiny computer that holds critical security information enabling a Mobile Network Operator/Mobile Virtual Network Operator (MNO/MVNO) to provide mobile services. The critical security information is the one or more subscription profiles. The SIM requires at least a subscription profile to join the mobile network 502. This entire process is called provisioning. In an embodiment, the provisioning of the one or more universal integrated circuit cards (UICC) 106 is performed when at least one of: the one or more first universal integrated circuit cards 106A and the one or more second universal integrated circuit cards 106B is in at least one of: an online state and an offline state.

In an embodiment of the present disclosure, the application-based cellular module 120 manages the provisioning of the one or more subscription profiles in the SIM. The one or more firmware 118 with the one or more cryptographic accelerators 130 used to provide a method for provisioning the UICC 106B. First, the one or more firmware 118 requests the one or more operating systems 122 to set up the TCP/IP stack for communication to the one or more IoT platforms 302. Second, the one or more firmware 118 is configured to run the application-based cellular module 120 to set up Bearer Independent Protocol (BIP) communication to the SIM from either the eUICC 106A or the UICC 106B. The BIP communication protocol requires the one or more cryptographic accelerators 130 to establish a secure channel as required by the eUICC 106A or the UICC 106B.

Figure 4:
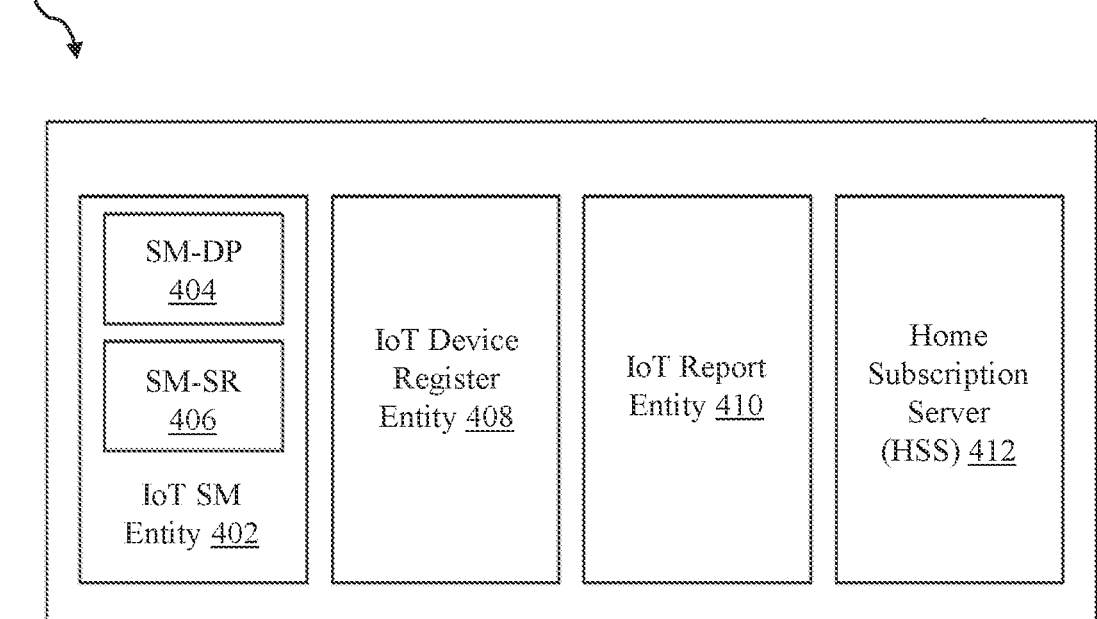
FIG. 4 is a block diagram illustrating the one or more IoT platforms for managing provisioning of the one or more UICCs, in accordance with an embodiment of the present disclosure.

FIG. 4 is a block diagram illustrating the one or more IoT platforms 302 for managing provisioning of the one or more UICCs 106, in accordance with an embodiment of the present disclosure. According to FIG. 4, in an embodiment of the present disclosure, the one or more IoT platforms 302 is in compliance with the 3GPP standard for servers in mobile communications. The one or more IoT platforms 302 includes one or more subscription manager entities 402 at least one of: one or more IoT device register entities 408, one or more IoT device report entities 410, and one or more home subscription servers (HSS) 412. The one or more IoT subscription manager (SM) entities 402 include at least one of: one or more subscription managers-data preparation (SM-DP) 404 and one or more subscription managers-secure routing (SM-SR) 406.

The one or more subscription managers-data preparation (SM-DP) 404 is configured to generate/manage the one or more subscription profiles for the one or more internet of things (IoT) devices 100 to download and install, upon the mobile network connection is initiated between the one or more internet of things (IoT) devices 100 and the one or more IoT platforms 302. The one or more subscription managers-secure routing (SM-SR) 406 is configured to securely transmit the one or more subscription profiles to the one or more internet of things (IoT) devices 100. In other words, the one or more subscription managers-data preparation (SM-DP) 404 and the one or more subscription managers-secure routing (SM-SR) 406 are part of the one or more IoT subscription manager (SM) entities 402 to accomplish secure provisioning of the one or more subscription profiles.

The one or more IoT device register entities 408 is configured to manage registration and activation of the one or more internet of things (IoT) devices 100, into the one or more IoT platforms 302. The one or more IoT device report entities 410 is configured to manage one or more reports received from the one or more internet of things (IoT) devices 100. The one or more home subscription servers (HSS) 412 is configured to control a number of the one or more universal integrated circuit cards 106 within a predetermined threshold value. In other words, the one or more home subscription servers (HSS) 412 is configured to control a SIM population in the one or more IoT platforms 302.

In an embodiment, even though the SGP.02 technical specification enforces the provisioning of the SIM starting with an SMS message, the application-based cellular module (i.e., the software-based cellular module) 120 handles it without an SMS plan on the UICC 106B. In addition, the one or more firmware 118 runs the one or more IoT platforms 302 based on algorithm that follows the method of operation of the one or more IoT devices 100.

Figure 5:
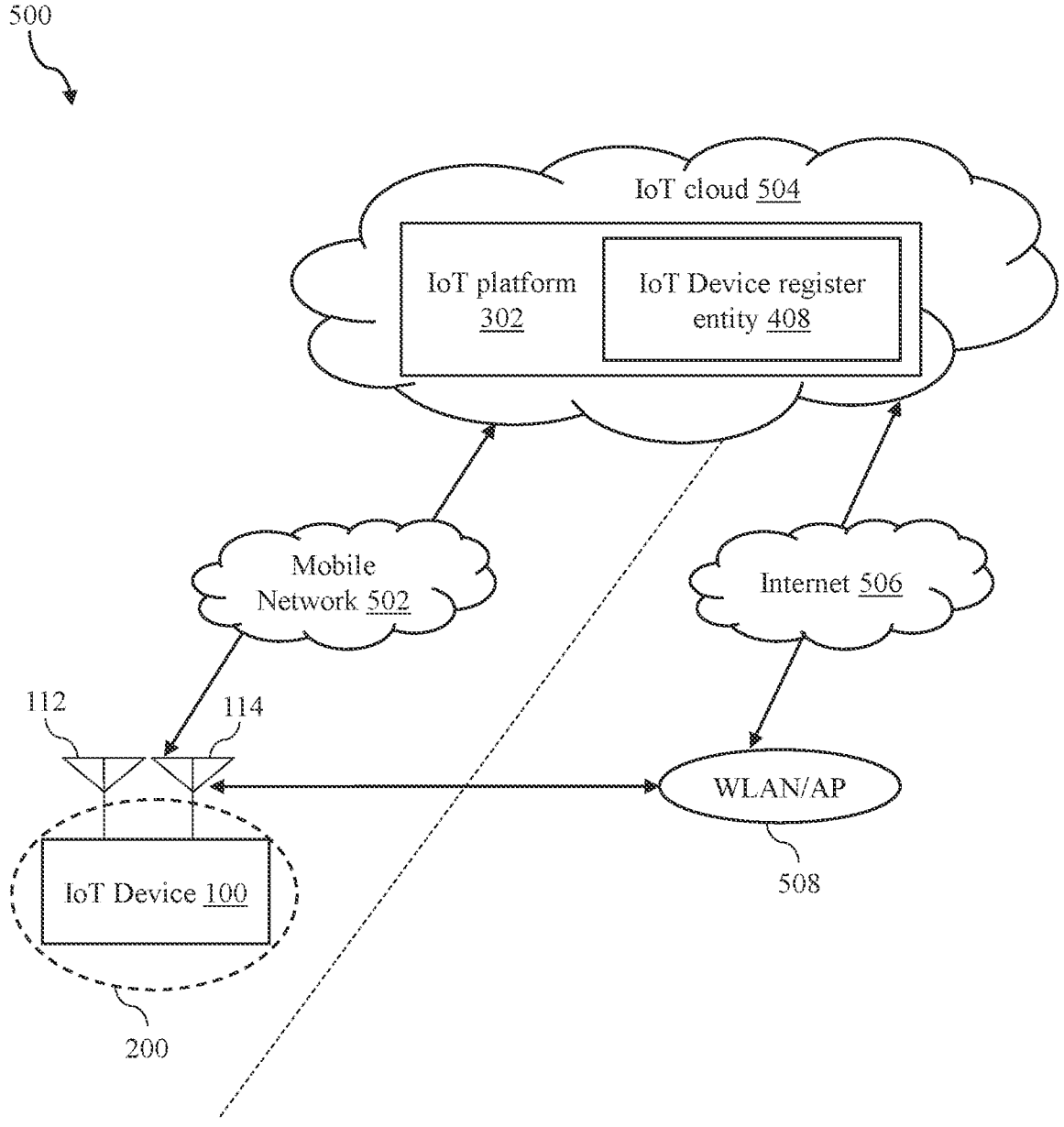
FIG. 5 is a schematic representation illustrating an exemplary IoT cloud for managing provisioning of the one or more UICCs, in accordance with an embodiment of the present disclosure.

FIG. 5 is a schematic representation 500 illustrating an exemplary IoT cloud 504 for managing provisioning of the one or more UICCs 106, in accordance with an embodiment of the present disclosure. According to FIG. 5, the one or more IoT devices 100 establishes the mobile network connection to the one or more IoT platforms 302 residing in the IoT cloud 504 using either the mobile network 502 or the internet 506, prioritizing the mobile network 502. The one or more IoT devices 100 also may connect to the one or more IoT platforms 302 via the internet 506 by connecting to the WLAN AP 508 using the one or more second radio frequency (RF) transceiver antennas 114. The WLAN AP 508 provides access to the internet 506 to reach to the one or more IoT platforms 302.

Figure 6:
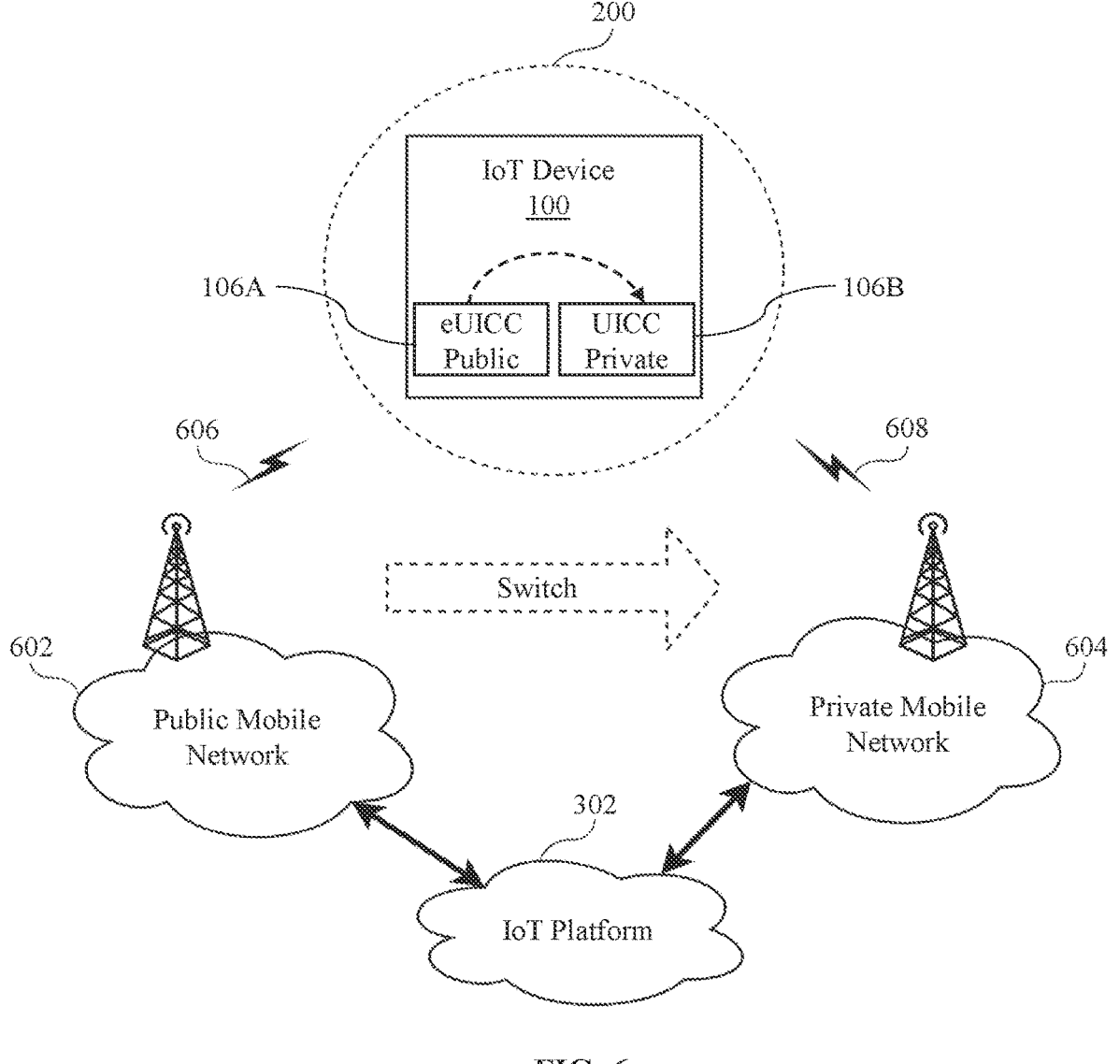
FIG. 6 is a schematic representation illustrating the connection between the one or more IoT devices and the one or more IoT platforms, in accordance with an embodiment of the present disclosure.

FIG. 6 is a schematic representation illustrating the connection between the one or more IoT devices 100 and the one or more IoT platforms 302, in accordance with an embodiment of the present disclosure. FIG. 6 depicts the ability of the one or more IoT devices 100 to switch the connection from the public mobile network 602 using a public radio link 606 and the eUICC 106A to the private mobile network 604 using a private radio link 608 and the UICC 106B. Initially, the one or more IoT devices 100 may be already connected to the one or more IoT platforms 302 using the eUICC 106A to connect to the public cellular network 602 of the MNO. When the one or more IoT devices 100 ends the provisioning to the UICC 106B, the one or more IoT devices 100 restarts the mobile network connection to connect to the private mobile network 604 instead of the public mobile network 602. The goal of the one or more IoT devices 100 is to switch the connection from the public mobile network 602 to the private mobile network 604.

FIG. 7 is a flow diagram illustrating an exemplary method 700 for managing provisioning of the one or more UICCs 106, in accordance with an embodiment of the present disclosure.

At step 702, the mobile network connection is initiated/established with the one or more IoT platforms 302. At step 704, the one or more instructions are received from the one or more IoT platforms 302.

At step 706, the one or more subscription profiles associated with the one or more second universal integrated circuit cards 106B, is downloaded from the one or more IoT platforms 302 upon receiving the one or more instructions. At step 708, the one or more subscription profiles is configured in the one or more second universal integrated circuit cards 106B, upon downloading the one or more subscription profiles from the one or more IoT platforms 302. At step 710, the mobile network connection is restarted to connect the one or more second universal integrated circuit cards of the one or more internet of things (IoT) devices with the one or more IoT platforms 302 through the second cellular network 604 based on the one or more subscription profiles configured in the one or more second universal integrated circuit cards 106B.

In an embodiment, the one or more secure microcontrollers 102 of the one or more internet of things (IoT) devices 100 is configured to restore the mobile network connection to connect to the one or more IoT platforms 302 if the enabled one or more subscription profiles in the one or more second universal integrated circuit cards 106B fails to enable the mobile network connection in the second cellular network 604.

The present invention has following advantages. The present invention with the unique IoT device 100 is configured to automatically switch the public cellular network 602 to the private cellular network in order to establish the mobile network connection with the one or more IoT platforms 302, so that there is no requirement of human intervention for changing the SIM to connect to the private cellular network 604.

Further, the present invention utilizes the one or more switch interfaces 110 configured to automatically switch the public cellular network 602 to the private cellular network 604 to connect the one or more IoT devices 100 quickly with the one or more IoT platforms 302. The present invention is further configured to remotely provisioning the one or more subscription profiles to the UICCs 106 based on the data plans instead of short message services (SMS) to save the budget of the enterprise IoT customers.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

What is claimed is:

1. A method for managing provisioning of one or more universal integrated circuit cards (UICC) in one or more internet of things (IoT) devices, the method comprising:

determining, by one or more switch interfaces of the one or more internet of things (IoT) devices, whether one or more first universal integrated circuit cards of one or more internet of things (IoT) devices is connected in a first cellular network through one or more first radio frequency (RF) transceiver antennas of the one or more internet of things (IoT) devices;

upon determining, switching, by the one or more switch interfaces of the one or more internet of things (IoT) devices, the one or more first universal integrated circuit cards of the one or more internet of things (IoT) devices connected in the first cellular network, to one or more second universal integrated circuit cards of the one or more internet of things (IoT) devices, by at least one of: one or more subscriber identity module (SIM) buses and one or more virtual buses;

initiating, by one or more cellular chipsets of the one or more internet of things (IoT) devices, a mobile network connection with one or more IoT platforms;

receiving, by one or more secure microcontrollers of the one or more internet of things (IoT) devices, one or more instructions from the one or more IoT platforms;

downloading, by one or more firmware of the one or more internet of things (IoT) devices, one or more subscription profiles associated with the one or more second universal integrated circuit cards of the one or more internet of things (IoT) devices, from the one or more IoT platforms upon receiving the one or more instructions;

configuring, by one or more application-based cellular modules of the one or more internet of things (IoT) devices, the one or more subscription profiles in the one or more second universal integrated circuit cards of the one or more internet of things (IoT) devices, upon downloading the one or more subscription profiles from the one or more IoT platforms; and rebooting, by the one or more secure microcontrollers of the one or more internet of things (IoT) devices, the mobile network connection to connect the one or more second universal integrated circuit cards of the one or more internet of things (IoT) devices with the one or more IoT platforms through a second cellular network based on the one or more subscription profiles configured in the one or more second universal integrated circuit cards of the one or more internet of things (IoT) devices.

2. The method of claim 1, further comprising:

receiving, by the one or more subscriber identity module (SIM) buses, information associated with the switching of the one or more second universal integrated circuit cards from the one or more first universal integrated circuit cards;

transmitting, by the one or more subscriber identity module (SIM) buses, the information to the one or more cellular chipsets through at least one of: the one or more virtual buses and one or more cellular buses;

transmitting, by the one or more cellular chipsets, the information to the one or more IoT platforms; and downloading, by the one or more firmware of the one or more internet of things (IoT) devices, the one or more subscription profiles associated with the one or more second universal integrated circuit cards of the one or more internet of things (IoT) devices, from the one or more IoT platforms, based on the information transmitted to the one or more IoT platforms.

3. The method of claim 1, further comprising:

receiving, by the one or more cellular chipsets, one or more attention (AT) instructions from the one or more secure microcontrollers through the one or more cellular buses; and managing, by the one or more cellular chipsets, the mobile network connection to a radio access network, based on the one or more attention (AT) instructions received from the one or more secure microcontrollers.

4. The method of claim 1, further comprising:

generating, by one or more subscription managers-data preparation (SM-DP) of the one or more IoT platforms, the one or more subscription profiles for the one or more internet of things (IoT) devices, upon the mobile network connection is initiated between the one or more internet of things (IoT) devices and the one or more IoT platforms;

securely transmitting, by one or more subscription managers-secure routing (SM-SR) of the one or more IoT platforms, the one or more subscription profiles to the one or more internet of things (IoT) devices;

managing, by one or more IoT device register entities of the one or more IoT platforms, registration and activation of the one or more internet of things (IoT) devices, into the one or more IoT platforms;

managing, by one or more IoT device report entities of the one or more IoT platforms, one or more reports received from the one or more internet of things (IoT) devices; and controlling, by one or more home subscription servers (HSS) of the one or more IoT platforms, a number of the one or more universal integrated circuit cards within a predetermined threshold value.

5. The method of claim 1, further comprising connecting, by the one or more first radio frequency (RF) transceiver antennas, the one or more internet of things (IoT) devices with at least one of: one or more wireless fidelity (Wi-Fi) networks and one or more Bluetooth devices.

6. The method of claim 1, wherein the mobile network connection is initiated between the one or more internet of things (IoT) devices and the one or more IoT platforms through the one or more first radio frequency (RF) transceiver antennas, based on working conditions of the one or more second radio frequency (RF) transceiver antennas.

7. The method of claim 1, wherein the provisioning of the one or more universal integrated circuit cards (UICC) is performed when at least one of: the one or more first universal integrated circuit cards and the one or more second universal integrated circuit cards is in at least one of: an online state and an offline state.

8. An internet of things (IoT) device for managing provisioning of one or more universal integrated circuit cards (UICC), the internet of things (IoT) device comprising:
one or more switch interfaces connected to at least one of:
one or more first universal integrated circuit cards (UICC) and one or more second universal integrated circuit cards, wherein the one or more switch interfaces is configured to:
determine whether the one or more first universal integrated circuit cards is connected in a first cellular network through one or more first radio frequency (RF) transceiver antennas of the one or more internet of things (IoT) devices; and
upon determining, switch the one or more first universal integrated circuit cards connected in the first cellular network, to the one or more second universal integrated circuit cards, by at least one of: one or more subscriber identity module (SIM) buses and one or more virtual buses;
one or more cellular chipsets configured to initiate a mobile network connection with one or more IoT platforms through the one or more second radio frequency (RF) transceiver antennas;
one or more secure microcontrollers configured to receive one or more instructions from the one or more IoT platforms;
one or more firmware configured to download one or more subscription profiles associated with the one or more second universal integrated circuit cards, from the one or more IoT platforms upon receiving the one or more instructions;
one or more application-based cellular modules configured to execute the one or more subscription profiles in the one or more second universal integrated circuit cards, upon downloading the one or more subscription profiles from the one or more IoT platforms; and
the one or more secure microcontrollers is further configured to reboot the mobile network connection to connect the one or more second universal integrated circuit cards of the one or more internet of things (IoT) devices with the one or more IoT platforms through a second cellular network based on the one or more subscription profiles configured in the one or more second universal integrated circuit cards.

9. The internet of things (IoT) device of claim 8, wherein:
the one or more subscriber identity module (SIM) buses is configured to:
receive information associated with the switching of the one or more second universal integrated circuit cards from the one or more first universal integrated circuit cards; and
transmit the information to the one or more cellular chipsets through at least one of: the one or more virtual buses and one or more cellular buses; and
the one or more cellular chipsets is configured to transmit the information to the one or more IoT platforms; and
the one or more firmware is configured to download the one or more subscription profiles associated with the one or more second universal integrated circuit cards, from the one or more IoT platforms, based on the information transmitted to the one or more IoT platforms.

10. The internet of things (IoT) device of claim 8, wherein the one or more cellular chipsets is configured to:
receive one or more attention (AT) instructions from the one or more secure microcontrollers through the one or more cellular buses; and
manage the mobile network connection to a radio access network, based on the one or more attention (AT) instructions received from the one or more secure microcontrollers.

11. The internet of things (IoT) device of claim 8, wherein the one or more IoT platforms comprises at least one of:
one or more subscription managers-data preparation (SM-DP) configured to generate the one or more subscription profiles for the one or more internet of things (IoT) devices, upon the mobile network connection is initiated between the one or more internet of things (IoT) devices and the one or more IoT platforms;
one or more subscription managers-secure routing (SM-SR) configured to securely transmit the one or more subscription profiles to the one or more internet of things (IoT) devices;
one or more IoT device register entities configured to manage registration and activation of the one or more internet of things (IoT) devices, into the one or more IoT platforms;
one or more IoT device report entities configured to manage one or more reports received from the one or more internet of things (IoT) devices; and
one or more home subscription servers (HSS) configured to control a number of the one or more universal integrated circuit cards within a predetermined threshold value.

12. The internet of things (IoT) device of claim 8, wherein the mobile network connection is initiated between the one or more internet of things (IoT) devices and the one or more IoT platforms through the one or more first radio frequency (RF) transceiver antennas, based on working conditions of the one or more second radio frequency (RF) transceiver antennas.

13. The internet of things (IoT) device of claim 8, wherein the one or more first universal integrated circuit cards is surface-mounted to the one or more internet of things (IoT) devices.

14. The internet of things (IoT) device of claim 8, wherein the one or more second universal integrated circuit cards is configured to be inserted within one or more surface-mounted slots in the one or more internet of things (IoT) devices.

15. The internet of things (IoT) device of claim 14, wherein the one or more surface-mounted slots for the one or more second universal integrated circuit cards, is compatible with a fourth form factor (4FF) size of the one or more second universal integrated circuit cards.

16. The internet of things (IoT) device of claim 8, wherein the one or more first radio frequency (RF) transceiver antennas is configured to connect with at least one of: one or more wireless fidelity (Wi-Fi) networks and one or more Bluetooth devices.

17. The internet of things (IoT) device of claim 8, wherein the one or more secure microcontrollers comprises at least one of: one or more random access memories (RAM), one or more non-volatile memories, and one or more cryptographic accelerators.

18. The internet of things (IoT) device of claim 8, wherein the provisioning of the one or more universal integrated circuit cards (UICC) is performed when at least one of: the one or more first universal integrated circuit cards (UICC) and the one or more second universal integrated circuit cards (UICC) is in at least one of: an online state and an offline state.

19. A non-transitory computer-readable storage medium having instructions stored therein that when executed by one or more hardware processors, cause the one or more hardware processors to execute operations of:

initiating a mobile network connection with one or more IoT platforms;

receiving one or more instructions from the one or more IoT platforms;

downloading one or more subscription profiles associated with one or more second universal integrated circuit cards of the one or more internet of things (IoT) devices, from the one or more IoT platforms upon receiving the one or more instructions;

configuring the one or more subscription profiles in the one or more second universal integrated circuit cards of the one or more internet of things (IoT) devices, upon downloading the one or more subscription profiles from the one or more IoT platforms; and rebooting the mobile network connection to connect the one or more second universal integrated circuit cards of the one or more internet of things (IoT) devices with the one or more IoT platforms through a second cellular network based on the one or more subscription profiles configured in the one or more second universal integrated circuit cards of the one or more internet of things (IoT) devices.

20. The non-transitory computer-readable storage medium of claim 19, further comprising:

receiving information associated with switching of the one or more second universal integrated circuit cards from one or more first universal integrated circuit cards;

transmitting the information to the one or more cellular chipsets through at least one of: the one or more virtual buses and one or more cellular buses;

transmitting the information to the one or more IoT platforms; and downloading the one or more subscription profiles associated with the one or more second universal integrated circuit cards of the one or more internet of things (IoT) devices, from the one or more IoT platforms, based on the information transmitted to the one or more IoT platforms.

* * * * *